United States Patent
Jensen et al.

(10) Patent No.: US 10,871,777 B2
(45) Date of Patent: Dec. 22, 2020

(54) AUTONOMOUS VEHICLE SENSOR COMPENSATION BY MONITORING ACCELERATION

(71) Applicant: UATC, LLC, San Francisco, CA (US)

(72) Inventors: Kenneth James Jensen, Alameda, CA (US); Mike Carter, La Jolla, CA (US); Soren Juelsgaard, San Fransicso, CA (US)

(73) Assignee: UATC, LLC, San Francisco, CA (US)

( * ) Notice: Subject to any disclaimer, the term of this patent is extended or adjusted under 35 U.S.C. 154(b) by 344 days.

(21) Appl. No.: 15/855,313

(22) Filed: Dec. 27, 2017

(65) Prior Publication Data

US 2019/0163189 A1     May 30, 2019

Related U.S. Application Data

(60) Provisional application No. 62/592,527, filed on Nov. 30, 2017.

(51) Int. Cl.
    *G05D 1/00*      (2006.01)
    *G05D 1/02*      (2020.01)

(52) U.S. Cl.
    CPC ......... *G05D 1/0212* (2013.01); *G05D 1/0088* (2013.01); *G05D 1/021* (2013.01); *G05D 1/0272* (2013.01)

(58) Field of Classification Search
None
See application file for complete search history.

(56) References Cited

U.S. PATENT DOCUMENTS

| | | | | |
|---|---|---|---|---|
| 6,225,894 B1* | 5/2001 | Kyrtsos | ..................... | B60Q 1/52 180/282 |
| 6,305,760 B1* | 10/2001 | Otake | ................... | B60T 8/1755 303/112 |
| 6,477,465 B1* | 11/2002 | McCall | .................. | G01C 21/16 701/454 |
| 6,915,200 B2* | 7/2005 | Tsuchiya | ................. | B60T 8/885 280/735 |
| 7,142,098 B2* | 11/2006 | Lang | ........................ | B60D 1/62 340/431 |
| 8,401,730 B2* | 3/2013 | Bechtler | ............... | B60T 8/3685 701/29.7 |
| 8,738,219 B2* | 5/2014 | Bechtler | ................. | B60T 8/885 701/31.1 |

(Continued)

*Primary Examiner* — Jonathan M Dager
(74) *Attorney, Agent, or Firm* — Dority & Manning, PA

(57) ABSTRACT

Systems and methods for compensating for acceleration-related sensor mismatch of an autonomous vehicle are provided. A computing system for compensating for autonomous vehicle acceleration-related sensor mismatch can include one or more processors and one or more tangible, non-transitory, computer readable media that collectively store instructions that when executed by the one or more processors cause the computing system to perform operations. The operations can include obtaining data indicative of an acceleration mismatch between a first portion and a second portion of an autonomous vehicle. The operations can further include determining a sensor compensation action based at least in part on the data indicative of the acceleration mismatch. The operations can further include implementing the sensor compensation action for the autonomous vehicle.

20 Claims, 6 Drawing Sheets

(56) References Cited

U.S. PATENT DOCUMENTS

| | | | |
|---|---|---|---|
| 8,862,422 B2* | 10/2014 | Ikkink | G11B 19/043 702/104 |
| 9,254,822 B1* | 2/2016 | Friend | G01C 21/16 |
| 9,804,594 B2* | 10/2017 | Gariepy | G05D 1/0246 |
| 10,241,215 B2* | 3/2019 | Medagoda | G01C 25/005 |
| 2007/0100550 A1* | 5/2007 | Hawkinson | G01C 21/16 701/510 |
| 2008/0234935 A1* | 9/2008 | Wolf | G01C 21/00 701/472 |
| 2009/0281756 A1* | 11/2009 | Weed | G01P 1/006 702/104 |
| 2010/0117894 A1* | 5/2010 | Velde | G01S 19/48 342/357.36 |
| 2010/0121601 A1* | 5/2010 | Eckert | F41G 7/007 702/104 |
| 2010/0318292 A1* | 12/2010 | Kulik | G01S 19/49 701/414 |
| 2011/0118967 A1* | 5/2011 | Tsuda | B60W 30/10 701/117 |
| 2012/0033078 A1* | 2/2012 | Huang | G01B 11/03 348/148 |
| 2012/0065883 A1* | 3/2012 | Williamson | G01C 21/165 701/501 |
| 2012/0203486 A1* | 8/2012 | Almalki | G01C 25/005 702/96 |
| 2013/0041549 A1* | 2/2013 | Reeve | G05D 1/0278 701/28 |
| 2013/0073142 A1* | 3/2013 | Hergesheimer | G01P 21/00 701/33.1 |
| 2013/0120147 A1* | 5/2013 | Narasimhan | A61B 5/1117 340/573.1 |
| 2014/0278191 A1* | 9/2014 | Anderson | G01P 21/00 702/104 |
| 2015/0081184 A1* | 3/2015 | Braunberger | B60T 7/20 701/70 |
| 2015/0224845 A1* | 8/2015 | Anderson | B60G 17/052 701/37 |
| 2016/0039342 A1* | 2/2016 | Jones | H04N 7/181 348/148 |
| 2016/0039343 A1* | 2/2016 | Jones | H04N 7/181 348/140 |
| 2016/0040992 A1* | 2/2016 | Palella | B60W 40/107 702/152 |
| 2016/0221575 A1* | 8/2016 | Posch | B60W 30/14 |
| 2016/0327394 A1* | 11/2016 | Al-Rawashdeh | G01C 21/16 |
| 2016/0377650 A1* | 12/2016 | Anderson | G01P 21/00 702/104 |
| 2017/0089706 A1* | 3/2017 | Ribeiro | G01R 33/10 |
| 2017/0106796 A1* | 4/2017 | Lavoie | B60R 1/00 |
| 2017/0184414 A1* | 6/2017 | Johnson | G01C 21/165 |
| 2017/0307379 A1* | 10/2017 | Steinhardt | G01S 19/47 |
| 2017/0368897 A1* | 12/2017 | Brickley | H04W 4/70 |
| 2018/0045536 A1* | 2/2018 | Kummerle; Rainer | G01S 17/08 |
| 2018/0087907 A1* | 3/2018 | DeBitetto | G01C 21/30 |
| 2018/0128645 A1* | 5/2018 | Wilkinson | G01C 21/005 |
| 2018/0231385 A1* | 8/2018 | Fourie | G01C 22/00 |
| 2018/0284243 A1* | 10/2018 | Wood | G01S 7/4972 |
| 2018/0339685 A1* | 11/2018 | Hill | B60T 8/176 |
| 2019/0092332 A1* | 3/2019 | Stark | G05D 1/0088 |
| 2019/0137294 A1* | 5/2019 | Jung | G06F 16/29 |
| 2019/0163201 A1* | 5/2019 | Jensen | G01S 19/53 |
| 2019/0217831 A1* | 7/2019 | Viele | G07C 5/0816 |
| 2019/0243382 A1* | 8/2019 | Takaki | G05D 1/0272 |
| 2019/0277655 A1* | 9/2019 | Masad | G01C 25/005 |

* cited by examiner

AUTONOMOUS VEHICLE SENSOR COMPENSATION BY MONITORING ACCELERATION

PRIORITY CLAIM

The present application is based on and claims priority to U.S. Provisional Application 62/592,527 having a filing date of Nov. 30, 2017, which is incorporated by reference herein.

FIELD

The present disclosure relates generally to compensating for acceleration-related sensor mismatch. More particularly, the present disclosure relates to systems and methods for compensating for acceleration-related sensor mismatch of an autonomous vehicle.

BACKGROUND

An autonomous vehicle is a vehicle that is capable of sensing its environment and navigating with minimal or no human input. In particular, an autonomous vehicle can observe its surrounding environment using a variety of sensors and can attempt to comprehend the environment by performing various processing techniques on sensor data collected by the sensors. Given knowledge of its surrounding environment, the autonomous vehicle can identify an appropriate motion path through such surrounding environment.

Thus, a key objective associated with an autonomous vehicle is the ability to determine the position and/or orientation of the autonomous vehicle relative to the surrounding environment. However, in some autonomous vehicle applications, such as on an autonomous truck, different portions of the autonomous vehicle may move relative to one another. For example, a suspension (e.g., an air-ride suspension) positioned between a cab portion and a chassis portion of an autonomous truck may allow the cab portion to pitch and/or roll relative to the chassis portion as the autonomous truck travels over various terrain features. In some situations, the pitch and/or roll of the cab portion relative to the chassis portion may cause sensor data mismatch. For example, as the cab portion pitches or rolls relative to the chassis portion, acceleration measurements from an inertial measurement unit located on the cab portion may not match acceleration measurements obtained from a wheel odometry sensor positioned on the chassis portion.

Further, in some situations, the pitch and/or roll of the cab portion relative to the chassis portion can cause the autonomous vehicle to misinterpret data from other sensors. For example, as the cab pitches or rolls, signals reflected off of the ground from a light detection and ranging (LIDAR) sensor positioned on the cab portion may be misinterpreted by the autonomous truck's autonomy system as an obstacle in front of the autonomous truck. Moreover, in some applications, reflected LIDAR signals, such as a point cloud, may be used to determine a position of the autonomous truck within the surrounding environment by comparing the point cloud to previously obtained point clouds and/or map data. However, when the cab portion pitches and/or rolls relative to the chassis portion, such LIDAR data may be misinterpreted, which can cause errors in determining the position of the autonomous vehicle.

SUMMARY

Aspects and advantages of embodiments of the present disclosure will be set forth in part in the following description, or can be learned from the description, or can be learned through practice of the embodiments.

One example aspect of the present disclosure is directed to a computing system for compensating for autonomous vehicle acceleration-related sensor mismatch. The computing system can include one or more processors and one or more tangible, non-transitory, computer readable media that collectively store instructions that when executed by the one or more processors cause the computing system to perform operations. The operations can include obtaining data indicative of an acceleration mismatch between a first portion and a second portion of an autonomous vehicle. The operations can further include determining a sensor compensation action based at least in part on the data indicative of the acceleration mismatch. The operations can further include implementing the sensor compensation action for the autonomous vehicle.

Another example aspect of the present disclosure is directed to a computer-implemented method for compensating for autonomous vehicle acceleration-related sensor mismatch. The method can include obtaining, by a computing system that comprises one or more computing devices, data indicative of an acceleration mismatch between a first portion and a second portion of an autonomous vehicle. The method can further include determining, by the computing system, a sensor compensation action based at least in part on the data indicative of the acceleration mismatch. The sensor compensation action can be associated with sensor data acquired via an inertial measurement unit or a wheel odometry sensor of the autonomous vehicle. The method can further include implementing, by the computing system, the sensor compensation action for the autonomous vehicle.

Another example aspect of the present disclosure is directed to an autonomous vehicle. The autonomous vehicle can include a chassis, a cab mounted to the chassis, a throttle system configured to accelerate the autonomous vehicle, a brake system configured to decelerate the autonomous vehicle, a steering system configured to control steering of the autonomous vehicle, an inertial measurement unit, a wheel odometry sensor, and a computing system. The computing system can include one or more processors and one or more tangible, non-transitory, computer readable media that collectively store instructions that when executed by the one or more processors cause the computing system to perform operations. The operations can include obtaining data indicative of an acceleration mismatch between the cab and the chassis. The operations can further include determining a sensor compensation action based at least in part on the data indicative of the acceleration mismatch. The sensor compensation action can be associated with sensor data acquired via the inertial measurement unit or the wheel odometry sensor. The operations can further include determining a pose of the autonomous vehicle based at least in part on the sensor compensation action.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
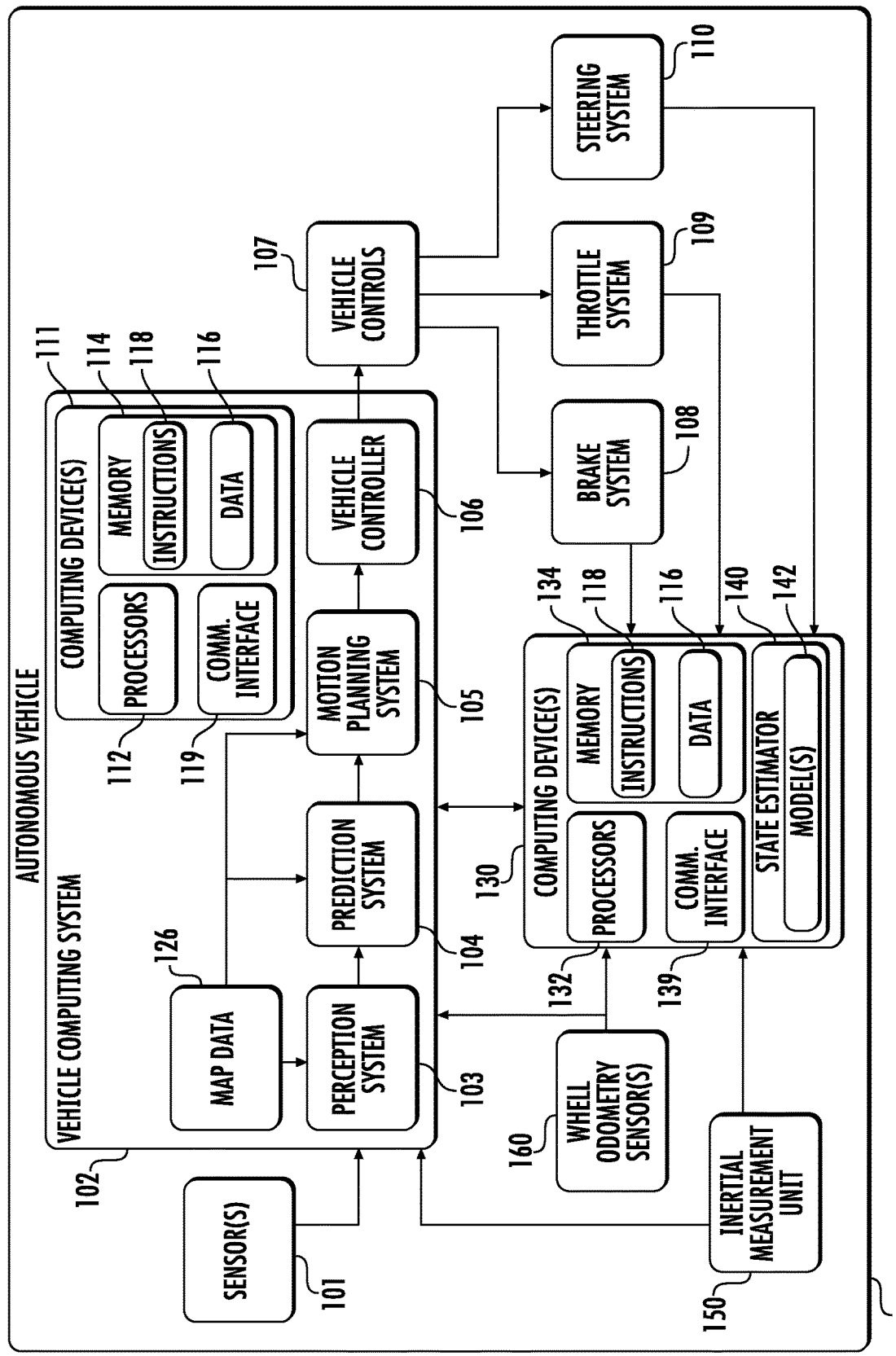
FIG. 1 depicts an example system overview according to example aspects of the present disclosure.

Example aspects of the present disclosure are directed to systems and methods for compensating for acceleration-related sensor mismatch of an autonomous vehicle. An autonomous vehicle can drive, navigate, operate, etc. with minimal and/or no interaction from a human driver to provide a vehicle service. By way of example, an autonomous vehicle can be an autonomous truck that is configured to autonomously navigate to deliver a shipment to a destination location. In order to autonomously navigate, the autonomous truck can include a plurality of sensors (e.g., LIDAR sensors, RADAR sensors, cameras, accelerometers, odometry sensors, etc.) configured to obtain sensor data associated with the vehicle's surrounding environment. For example, one or more first sensors can be located onboard a chassis portion of the autonomous truck and one or more second sensors can be located onboard a cab portion of the autonomous truck. The sensor data can be used by a vehicle autonomy system (e.g., an autonomous vehicle computing system) to navigate the autonomous truck through the surrounding environment. The cab portion and the chassis portion can move relative to one another (e.g., via a suspension system associated with the cab, etc.). Such movement can cause the vehicle's sensor(s) to move in relation to one another such that measurements from two or more of the sensors do not match.

For example, an autonomous vehicle can include various acceleration sensors, such as an inertial measurement unit ("IMU") and/or one or more wheel odometry sensors. In some implementations, the IMU can be located on a cab portion of the autonomous truck, whereas the one or more wheel odometry sensors can be located on a chassis portion. The IMU can include one or more accelerometers and/or one or more gyroscopes, and can be configured to obtain acceleration measurements along and/or about various axes (e.g., in three dimensions). Similarly, the one or more wheel odometry sensors can obtain measurements of the rotation of the wheels, from which a position, a velocity, and/or an acceleration of the autonomous vehicle can be determined. However, when the cab portion of the autonomous truck pitches or rolls in relation to the chassis portion, such as due to the autonomous truck travelling over a pothole, the acceleration measurements from the IMU and the one or more wheel odometry sensors may not match due the relative motion of the two portions. This, in turn, can cause sensor data from other sensors to be misinterpreted by the vehicle autonomy system. For example, during operation of the autonomous truck, a LIDAR sensor positioned on the cab portion can obtain data indicative of the surrounding environment, such as sensor data indicative of a location/position of the ground on which the vehicle is travelling. In some situations, the acceleration-related sensor mismatch between the IMU and the wheel odometry sensors can cause the vehicle autonomy system to interpret the ground as an obstacle in front of the autonomous vehicle, and therefore control the autonomous vehicle to a stop in response to the interpreted obstacle.

In accordance with the present disclosure, a computing system of the autonomous vehicle can be configured to compensate for acceleration-related sensor mismatch. By way of example, the computing system can obtain data indicative of an acceleration mismatch between a first portion and a second portion of an autonomous vehicle. The computing system can then determine a sensor compensation action based at least in part on data indicative of the acceleration mismatch (e.g., disregard data over a threshold value). The computing system can then implement the sensor compensation action for the autonomous vehicle. In this way, the vehicle computing system of the autonomous vehicle can compensate for acceleration-related sensor mismatch.

More particularly, an autonomous vehicle can be a ground-based vehicle with multiple portions that can move at least partially independent of one another. For example, the autonomous vehicle can be an autonomous truck that includes a first portion and a second portion that move at least partially independently from one another. For example, the first portion can be a cab portion and the second portion can be a chassis portion that are affixed to one another (e.g., permanently, temporarily). The cab portion can move at least partially independently from the chassis portion due to a suspension system associated with the cab portion (e.g., air suspension, spring suspension, etc.). For example, the cab portion can move relative to the chassis portion about a pitch axis and/or a roll axis (e.g., one portion experiences a pitch, roll, etc. movement while the other does not).

The autonomous vehicle can include a vehicle computing system with various components to help the vehicle autonomously navigate with minimal and/or no interaction from a human driver. For example, the autonomous vehicle can include a plurality of sensors (e.g., LIDAR sensors, radio detection and ranging (RADAR) sensors, cameras, etc.). The sensors can be configured to acquire sensor data associated with the surrounding environment of the vehicle. The sensor data can be used in a processing pipeline that includes the detection of objects proximate to the autonomous vehicle, object motion prediction, and vehicle motion planning. For example, a motion plan can be determined by the vehicle computing system, and the vehicle can be controlled by a vehicle controller to initiate travel in accordance with the motion plan. The autonomous vehicle can further include various systems configured to assist in autonomous travel. For example, a throttle system can be configured to accelerate the vehicle, a brake system can be configured to decelerate the vehicle, and a steering system can be configured to control steering of the vehicle. In some implementations, the vehicle controller can control the throttle system, the brake system, the steering system, and/or other systems in order to cause the vehicle to travel in accordance with the motion plan.

The sensors of the autonomous vehicle can be placed on the various portions of the vehicle. For example, one or more first sensors can be located onboard a first portion (e.g., the cab portion) of the autonomous vehicle and one or more second sensors can be located onboard a second portion (e.g., the chassis portion) of the autonomous vehicle. As such, the sensors can be subjected to the independent movements of that respective vehicle portion.

For example, in some implementations, an IMU can be positioned on the cab portion of the autonomous vehicle. For example, the IMU can be positioned on top of the cab portion adjacent to one or more sensors, such as one or more LIDAR sensors. The IMU can include one or more accelerometers, gyroscopes, or other devices configured to measure an acceleration of the autonomous vehicle. In some implementations, the IMU can measure acceleration in three-dimensions, such as along one or more axes and/or about a roll axis, about a pitch axis, and in a vertical direction. For example, the roll axis and the pitch axis can be perpendicular to one another, and generally define a plane parallel to the ground on which the autonomous vehicle travels. The vertical direction can be generally perpendicular to the plane defined by the pitch axis and roll axis. The IMU can include accelerometers, gyroscopes, or other acceleration measuring devices to obtain acceleration measurements about the pitch axis, about the roll axis, or along the vertical direction. Data obtained by the IMU can be provided to a computing system to determine an acceleration of the autonomous vehicle.

For example, the data generated by the IMU can be provided to a state estimator, which can be used to determine a pose of the vehicle. The pose can be, for example, a roll, a pitch, or a yaw of the autonomous vehicle, or a position of the autonomous vehicle in a surrounding environment of the autonomous vehicle. For example, the pose can generally describe how the vehicle is positioned in the surrounding environment (e.g., where the vehicle is located and how the vehicle is oriented with respect to the surrounding environment). The pose can be used, for example, to orient sensor data from one or more sensors of the autonomous vehicle with respect to the surrounding environment.

In some implementations, one or more wheel odometry sensors can be included on a chassis portion of the autonomous vehicle. For example, the chassis can generally include a frame, axles, wheels, suspension components, and other components. One or more wheel odometry sensors can be configured to obtain measurements of a rotation of a respective wheel. Data obtained by the wheel odometry sensors can be used to determine a position, a velocity and/or an acceleration of the vehicle. For example, the data obtained by the wheel odometry sensors can be provided to the state estimator.

Under some operating conditions, the respective accelerations measured by the IMU and the one or more wheel odometry sensors may not match. For example, when the autonomous vehicle traverses over a pothole or other roadway feature, the air-suspension of the cab may cause the cab to pitch or roll with respect to the chassis. Due to the independent movement of the cab with respect to the chassis, an acceleration measured by the IMU on the cab portion may not be the same or similar as an acceleration determined from data from the wheel odometry sensors on the chassis portion. Similarly, in some situations, data from an IMU may not match a zero lateral velocity constraint of the chassis. For example, the relative movement of the cab with respect to the chassis may not match the zero lateral velocity constraint of the chassis in a state estimator, such as a Kalman filter.

According to example aspects of the present disclosure, a computing system can be configured to obtain data indicative of an acceleration mismatch between a first portion and a second portion of the autonomous vehicle. In some implementations, the computing system can be a stand-alone computing system, such as a stand-alone sensor computing system, while in other implementations, the computing system can be integrated into or otherwise a part of the vehicle computing system. In some implementations, the stand-alone computing system can be configured to communicate with the vehicle computing system, such as via one or more wired or wireless networks.

For example, in some implementations, the computing system comprising one or more computing devices can obtain data indicative of a first measurement from a first sensor (e.g., IMU), and data indicative of a second measurement from a second sensor (e.g., wheel odometry sensor) and can determine that the acceleration measurements do not match. For example, an acceleration measurement from an IMU may indicate that a vehicle is accelerating due to a pitch motion of the cab, while an acceleration measurement from a wheel odometry sensor may indicate that the vehicle is not experiencing any acceleration. Similarly, an acceleration measurement from an IMU may not match a zero velocity measurement (e.g., a ZUPT measurement) for a chassis portion of the vehicle. In some implementations, the computing system can be configured to obtain data indicative of an acceleration mismatch by obtaining respective signals from the first sensor and the second sensor.

In some implementations, the computing system can obtain data indicative of the acceleration mismatch by obtaining a signal associated with a brake system, a throttle system, and/or a steering system.

For example, in some implementations, the vehicle controller can send a signal to a throttle system or a brake system of the autonomous vehicle in order to cause the throttle system or the brake system to accelerate or decelerate the autonomous vehicle. In some implementations, the computing system can be configured to obtain or otherwise receive the brake system or throttle system signal. For example, in some implementations, the computing system can be configured to read signals sent over a vehicle network or relay signals sent from one vehicle system to another.

In some implementations, the acceleration or deceleration of the autonomous vehicle can be known to cause an acceleration mismatch for one or more sensors. For example, operating the autonomous vehicle at a particular throttle system or brake system setpoint can be known to cause the first portion (e.g., cab) to move (e.g., pitch) with respect to the second portion (e.g., chassis).

Similarly, in some implementations, the computing system can obtain data indicative of the acceleration mismatch by obtaining a signal from a steering system. For example, the vehicle controller can send a signal to a steering system in order to cause the steering system to turn the autonomous vehicle. In some implementations, turning at a particular rate, such as a rate greater than a threshold, can be known to cause an acceleration mismatch for one or more sensors. For example, turning the autonomous vehicle at a particular rate can be known to cause the first portion (e.g., cab) to move (e.g., roll) with respect to the second portion (e.g., chassis).

In some implementations, the data indicative of the acceleration mismatch can be data indicative of an acceleration value greater than a threshold. For example, in some situations, an acceleration measurement from a single sensor that exceeds a threshold value can be known to cause acceleration-related sensor mismatch. Thus, in some implementations, acceleration-related sensor mismatch does not require a comparison of two or more sensor values. Rather, a single sensor measurement can be known to cause acceleration-related mismatch, and can be compensated for accordingly. For example, traveling over a pothole or other roadway feature may cause the cab to pitch or roll with respect to the chassis. In such a situation, a sensor (e.g., IMU) positioned on the cab may measure an acceleration that exceeds a threshold due to the swaying motion (e.g., pitch/roll) of the suspension's response to the pothole. In some implementations, the threshold value can be a value determined at least in part on one or more previous driving sessions in which the autonomous vehicle experienced an acceleration which caused sensor mismatch, such as, for example, driving over a pothole or other roadway feature. The computing system can be configured to obtain or otherwise receive a signal from the IMU. The signal from the IMU can include data indicative of an acceleration value greater than the threshold from the sensor (e.g., IMU).

Similarly, a wheel odometry sensor may measure an acceleration that exceeds a threshold. The computing system can similarly be configured to obtain or otherwise receive data indicative of an acceleration mismatch by obtaining a signal from the wheel odometry sensor. For example, the signal from the wheel odometry sensor can include data indicative of an acceleration value greater than a threshold. Further, signals associated with a throttle system, brake system, and/or steering system can all similarly be known to cause acceleration-related sensor mismatch when a setpoint (e.g., throttle, brake, or steering setpoint) exceeds a threshold. Thus, the computing system can obtain a signal associated with a brake system, a throttle system, or a steering system, which can be indicative of an acceleration value greater than a threshold.

The computing system can further determine a sensor compensation action based at least in part on the data indicative of the acceleration mismatch. For example, in some implementations, the computing system can disregard data from an IMU or a wheel odometry sensor for a period of time.

For example, in some implementations, the computing system can be configured to determine a pose of the autonomous vehicle using a state estimator. In some implementations, the state estimator can include a Kalman filter configured to receive a plurality of inputs and determine a state of the autonomous vehicle based on the plurality of inputs. In some implementations, the computing system can disregard data from an IMU or a wheel odometry sensor by not inputting the data indicative of an acceleration mismatch into the Kalman filter. For example, if an acceleration value from an IMU exceeds a threshold, the computing system can disregard the data by not inputting the data from the IMU into the Kalman filter. In other implementations, the computing system can disregard the data indicative of an acceleration mismatch by, for example, providing a null value for a sensor into the state estimator (e.g., a zero value), or by inputting a previously obtained acceleration measurement (e.g., holding an input steady by inputting a measurement from a period of time prior to the acceleration value exceeding the threshold). In some implementations, the computing system can disregard the data for a specific period of time (e.g., 100 ms, 500 ms, 1 second, 5 seconds, etc.).

In some implementations, the sensor compensation action can include increasing an uncertainty parameter associated with sensor data from an IMU or a wheel odometry sensor. For example, in some implementations, a state estimator can use data from a plurality of sensors, and each respective sensor's data set can include an uncertainty parameter associated with the data from the sensor. In some implementations, the computing system can increase or decrease the uncertainty parameter associated with sensor data. For example, the computing system can obtain data indicative of an acceleration from an IMU and one or more wheel odometry sensors. In some implementations, a first wheel odometry sensor may measure an acceleration that exceeds a threshold and/or exceeds an acceleration measured by a second wheel odometry sensor and/or an IMU. In some implementations, the computing system can increase the uncertainty parameter associated with the first wheel odometry sensor. The increased uncertainty parameter can indicate to the state estimator (e.g., Kalman filter), that the associated acceleration measurement may not be accurate. Similarly, the computing system can adjust an uncertainty parameter associated with an IMU or the second wheel odometry sensor. For example, the computing system can decrease the uncertainty parameter associated with the IMU or the second wheel odometry sensor. In this way, the computing system can adjust the uncertainty parameter associated with sensor data from an IMU or a wheel odometry sensor.

In some implementations, the sensor compensation action can include modeling the acceleration of the first portion relative to the second portion using an autonomous vehicle model in a state estimator. For example, in some implementations, the state estimator can include an autonomous vehicle model configured to model the first portion (e.g., cab) of the autonomous vehicle moving about a pitch axis or a roll axis with respect to the second portion (e.g., chassis). In some implementations, the model can be a rotational pendulum-spring model. Other suitable models can similarly be used. The data obtained from the IMU and/or wheel odometry sensor(s) can be input into the autonomous vehicle model to model the movement of the first portion (e.g., cab) relative to the second portion (e.g., chassis).

The computing system can be configured to implement the sensor compensation action by, for example, performing the sensor compensation actions described herein. For example, the computing system can disregard data by not inputting it into a model, adjusting an uncertainty parameter associated with the data prior to inputting the data into a state estimator, or modeling the movement of the first portion relative to the second portion using an autonomous vehicle model.

In some implementations, the computing system can further determine a pose of the autonomous vehicle following implementation of the sensor compensation action. For example, in some implementations, the computing system can first model the movement of the first portion relative to the second portion to determine an orientation of the first position relative to the second portion, and can then determine a yaw, pitch, or roll of the autonomous vehicle, or a position of the autonomous vehicle in a surrounding environment of the autonomous vehicle. In some implementations, the computing system can disregard data from an IMU or a wheel odometry sensor, adjust the uncertainty of such data, and/or use an autonomous vehicle model to determine the pose of the autonomous vehicle.

In some implementations, the computing system can further determine a motion plan for the autonomous vehicle based at least in part on the pose. For example, the pose can describe the position and orientation of the autonomous vehicle and/or the various portions of the autonomous vehicle in the surrounding environment, and the computing system can determine the motion plan to determine how the autonomous vehicle will travel within the surrounding environment.

In some implementations, the computing system can further cause the autonomous vehicle to initiate travel in accordance with at least a portion of the motion plan. For example, the computing system and/or a vehicle controller can control a throttle system, brake system, steering system, and/or another vehicle system to cause the autonomous vehicle to travel within the surrounding environment according to the motion plan.

The systems and methods described herein may provide a number of technical effects and benefits. For example, the systems and methods provide for more accurate autonomous operation. For example, as described herein, sensor data can be used to detect objects within the vehicle's surroundings and to help predict the motion of such objects, which is ultimately used for vehicle motion planning. By accounting for acceleration-related sensor mismatch, the systems and methods described herein can allow for an autonomous vehicle to more accurately determine the pose of the vehicle in the surrounding environment, such as the vehicle's position and orientation within the surrounding environment. This, in turn, can improve the motion planning and vehicle control functions of the autonomous vehicle.

Thus, acceleration-related sensor mismatch can lead to less accurate object detection, object motion prediction, and vehicle motion planning. The movement associated with a first portion of a vehicle relative to the second portion can cause the sensor data captured by the sensors mounted on that vehicle portion (e.g., cab portion, etc.) to be misinterpreted by the vehicle autonomy system. The systems and methods described herein provide a solution to address potential sensor mismatch in real-time, as the errors may arise due to vehicle movements. Thus, the systems and methods of the present disclosure can improve autonomous vehicle operation by compensating for acceleration-related sensor mismatch.

The systems and methods of the present disclosure can also increase the safety of autonomous vehicle operation. For example, by more accurately determining the pose of the autonomous vehicle, the autonomous vehicle can more accurately plan and travel within the surrounding environment of the autonomous vehicle. For example, by helping to improve the autonomous vehicle's understanding of its position and orientation within the surrounding environment, the autonomous vehicle can more accurately interpret the surrounding environment (e.g., the ground, obstacles, etc.) and therefore plan and move within the environment. This can help to ensure that the autonomous vehicle responds to the surrounding environment in a more consistent, predictable manner.

The systems and methods of the present disclosure also provide an improvement to vehicle computing technology, such as autonomous vehicle computing technology. For instance, the systems and methods enable the vehicle technology to obtain data indicative of an acceleration mismatch between a first portion and a second portion of the autonomous vehicle. For example, the systems and methods enable one or more on-board computing device(s) to obtain data from a brake system, a throttle system, a steering system, a wheel odometry sensor, or an inertial measurement unit. The computing device(s) can determine a sensor compensation action based at least in part on the data indicative of the acceleration mismatch. The computing device(s) can implement the sensor compensation action for the autonomous vehicle. For example, the computing device(s) can disregard certain data, increase an uncertainty parameter associated with certain data, or model the movement of the first portion relative to the second portion. In this way, the systems and methods enable the autonomous vehicle to more accurately determine the pose of the autonomous vehicle, thereby more allowing for more efficient use of sensor data collected by the autonomous vehicle. Thus, the systems and methods of the present disclosure can improve the accuracy of vehicle sensor technology, as well as the efficacy of the vehicle's autonomy system.

With reference now to the FIGS., example aspects of the present disclosure will be discussed in further detail. FIG. 1 depicts a block diagram of an example vehicle 10 according to example aspects of the present disclosure. In some implementations, the vehicle 10 can be an autonomous vehicle 10, and can include one or more sensors 101, a vehicle computing system 102, and one or more vehicle controls 107. The vehicle 10 incorporating the vehicle computing system 102 can be a ground-based autonomous vehicle (e.g., car, truck, bus), an air-based autonomous vehicle (e.g., airplane, drone, helicopter, or other aircraft), or other types of vehicles (e.g., watercraft). The vehicle 10 can be an autonomous vehicle that can drive, navigate, operate, etc. with minimal and/or no interaction from a human driver. For example, the vehicle 10 can operate semi-autonomously with some interaction from a human driver present in the vehicle. The vehicle 10 can be configured to operate in a fully autonomous manner (e.g., self-driving manner) such that the vehicle 10 can drive, navigate, operate, etc. with no interaction from a human driver.

Figure 2:
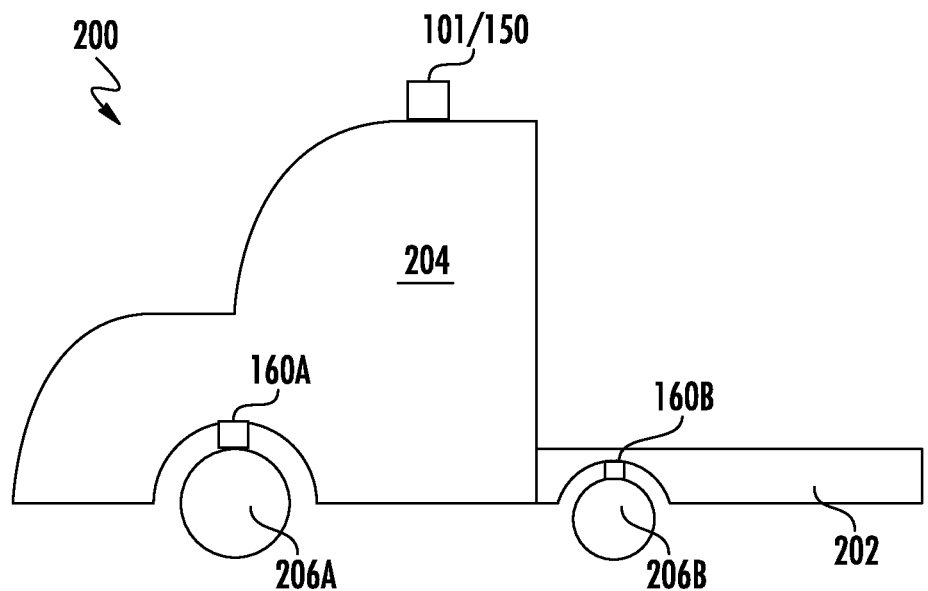
FIG. 2 depicts a side view of an example autonomous vehicle according to example aspects of the present disclosure.
Figure 3:
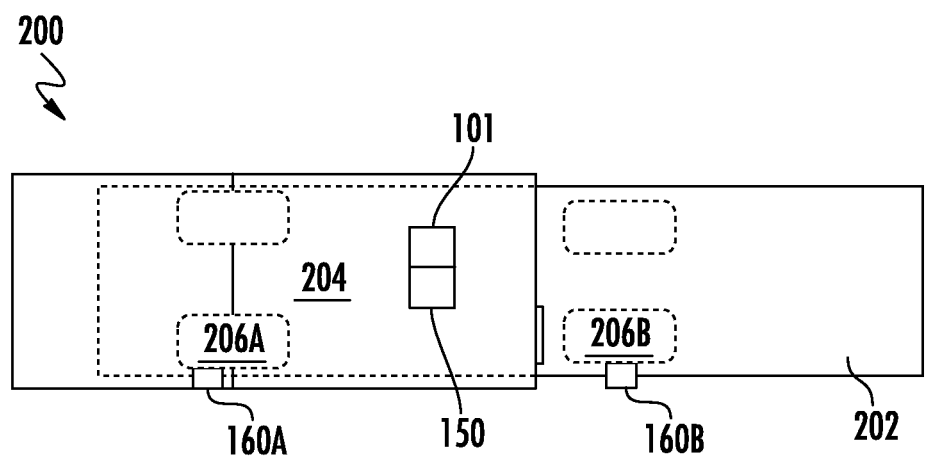
FIG. 3 depicts a top-down view of an example autonomous vehicle according to example aspects of the present disclosure.
Figure 4:
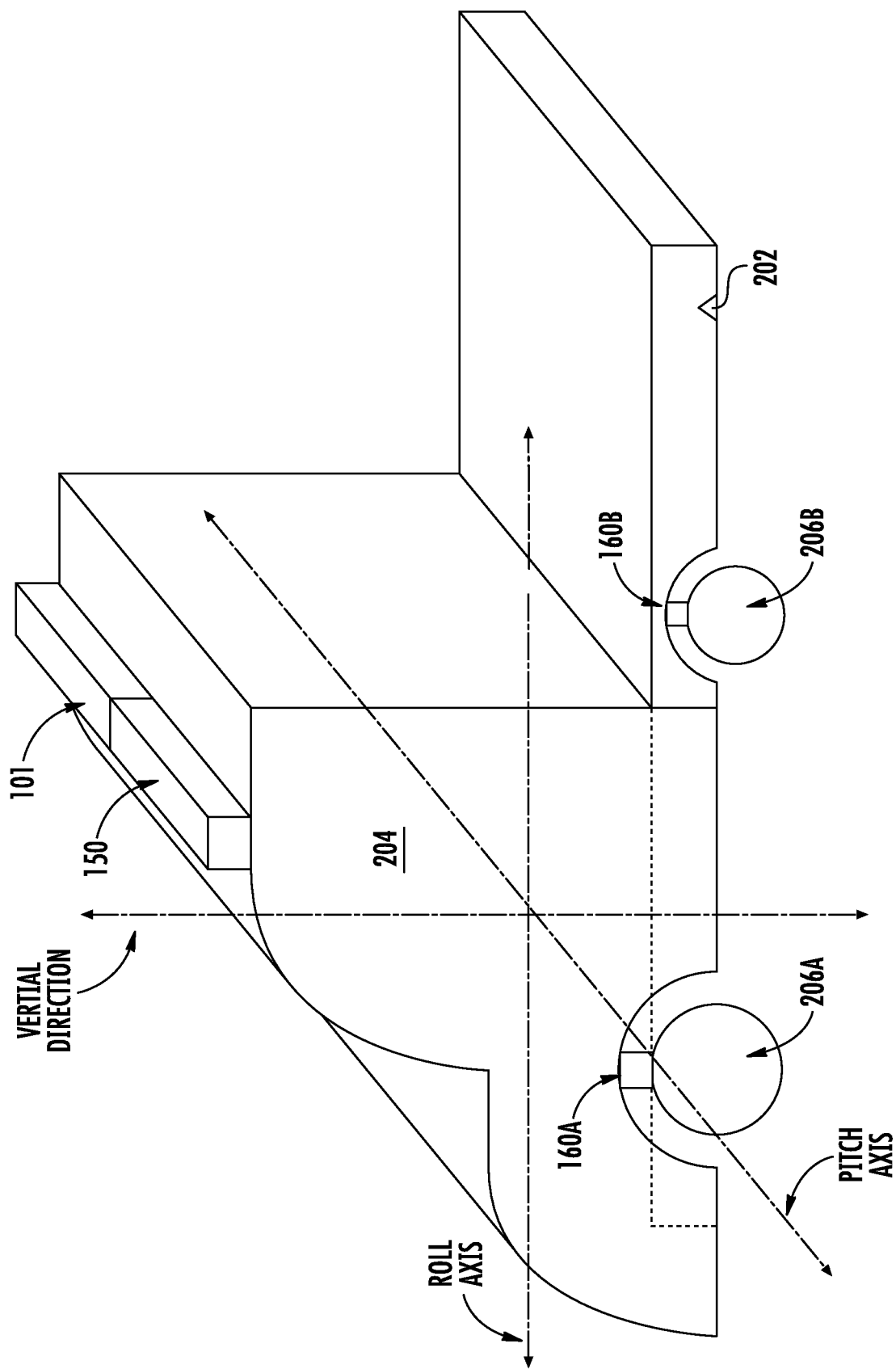
FIG. 4 depicts a perspective view of an example autonomous vehicle according to example aspects of the present disclosure.

FIGS. 2-4 depict an example vehicle 200 according to example embodiments of the present disclosure. For example, FIG. 2 depicts a side view of an example vehicle 200, FIG. 3 depicts a top down view of the vehicle 200, and FIG. 4 depicts a perspective view of the vehicle 200. The vehicle 10 of FIG. 1 can be the vehicle 200 or can be other types of vehicles.

The vehicle 200 is an autonomous truck that includes a first portion and a second portion (e.g., different than the first portion). The first portion and the second portion can be configured to move at least partially independently from one another. For example, one portion can experience a movement (e.g., a pitch, yaw, roll, other movement) while the other portion does not. As examples, the first and the second portions can be non-rigidly coupled; flexibly coupled; jointedly coupled; pivotably coupled; coupled via a ball and socket connection; and/or coupled via other forms of coupling that allow at least partial independent movement respective to each other. By way of example, the first portion can be a chassis portion 202 and the second portion can be a cab portion 204, or vice versa, that are affixed to one another. The cab portion 204 can move at least partially independently from the chassis portion 202 due to a suspension system associated with the cab portion 204 (e.g., air suspension, spring suspension, etc.).

The vehicle 200 can include one or more wheels 206. For example, as shown, a first wheel 206A is shown towards a front portion of the vehicle 200, and a second wheel 206B is shown towards a rear portion of the vehicle 200. Additional wheels can further be included in a vehicle 200.

In some implementations, one or more wheel odometry sensors 160 can also be included in a vehicle 200. Each wheel odometry sensor 160 can be configured to obtain measurements of the rotation a respective wheel, from which a position, a velocity, and/or an acceleration of the autonomous vehicle can be determined. For example, as shown, a first wheel odometry sensor 160A can obtain measurements of the first wheel 206A, and a second wheel odometry sensor 106B can obtain measurements of the second wheel 206B. Additional wheel odometry sensors 160 can be included in a vehicle 200.

In some implementations, one or more inertial measurement units ("IMUs") 150 can be included in a vehicle 200. For example, as shown, an IMU 150 is positioned on a top portion of the cab portion 204. The one or more IMUs 150 can include one or more accelerometers and/or one or more gyroscopes, and can be configured to obtain acceleration measurements along various axes (e.g., in three dimensions). Other IMUs 150 can be included in a vehicle 200 at other locations of the vehicle 200

In some implementations, one or more sensors 101 can further be positioned on various portions of the vehicle 200. For example, as shown, a sensor 101 is positioned on top of the cab portion 204 proximate to the IMU 150. Other sensors 101 can be positioned on the vehicle 200 at various locations of the vehicle 200.

As shown in FIG. 4, the vehicle 200 can be associated with a pitch axis, a roll axis, and a vertical direction. For example, the roll axis and the pitch axis can be perpendicular to one another, and generally define a plane parallel to the ground on which the vehicle 200 travels. The vertical direction can be generally perpendicular to the plane defined by the pitch axis and roll axis. In some implementations, the IMU 150 can be configured to obtain acceleration measurements about the pitch axis, about the roll axis, or along the vertical direction. In some implementations, the cab portion 204 can move relative to the chassis portion 202 about the pitch axis and/or the roll axis (e.g., one portion experiences a pitch, roll, etc. movement while the other does not).

Referring back to FIG. 1, the vehicle computing system 102 can assist in controlling the autonomous vehicle 10. In particular, the vehicle computing system 102 can receive sensor data from the one or more sensors 101, attempt to comprehend the surrounding environment by performing various processing techniques on data collected by the sensors 101, and generate an appropriate motion plan through such surrounding environment. The vehicle computing system 102 can control the one or more vehicle controls 107 to operate the autonomous vehicle 10 according to the motion plan.

The vehicle computing system 102 can include one or more computing devices 111. The one or more computing devices 111 can include one or more processors 112 and one or more memory 114. The one or more processors 112 can be any suitable processing device (e.g., a processor core, a microprocessor, an ASIC, a FPGA, a computing device, a microcontroller, etc.) and can be one processor or a plurality of processors that are operatively connected. The one or more memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which can be executed by the processor 112 to cause vehicle computing system 102 to perform operations. The one or more computing devices 111 can also include a communication interface 119, which can allow the one or more computing devices 111 to communicate with other components of the autonomous vehicle 10 or external computing systems, such as via one or more wired or wireless networks.

As illustrated in FIG. 1, the vehicle computing system 102 can include a perception system 103, a prediction system 104, and a motion planning system 105 that cooperate to perceive the surrounding environment of the autonomous vehicle 10 and determine a motion plan for controlling the motion of the autonomous vehicle 10 accordingly. In some implementations, the perception system 103, the prediction system 104, the motion planning system 105 can be included in or otherwise a part of a vehicle autonomy system. As used herein, the term "vehicle autonomy system" refers to a system configured to control the movement of an autonomous vehicle.

In particular, in some implementations, the perception system 103 can receive sensor data from the one or more sensors 101 that are coupled to or otherwise included within the autonomous vehicle 10. As examples, the one or more sensors 101 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 10.

As one example, for a LIDAR system, the sensor data (or a signal associated with a LIDAR sensor) can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light. In some implementations, a LIDAR sensor can be positioned on top of a cab portion 204 of a vehicle 200.

As another example, for a RADAR system, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

As another example, the one or more sensors 101 can include a positioning system. The positioning system can determine a current position of the vehicle 10. The positioning system can be any device or circuitry for analyzing the position of the vehicle 10. For example, the positioning system can determine a position by using one or more of inertial sensors (e.g., IMUs), a satellite positioning system, based on IP address, by using triangulation and/or proximity to network access points or other network components (e.g., cellular towers, WiFi access points, etc.) and/or other suitable techniques. The position of the vehicle 10 can be used by various systems of the vehicle computing system 102.

Thus, the one or more sensors 101 can be used to collect sensor data that includes information that describes the location (e.g., in three-dimensional space relative to the autonomous vehicle 10) of points that correspond to objects within the surrounding environment of the autonomous vehicle 10. In some implementations, the sensors 101 can be located at various different locations on the autonomous vehicle 10. As an example, in some implementations, one or more cameras and/or LIDAR sensors can be located in a pod or other structure that is mounted on a roof of the autonomous vehicle 10 while one or more RADAR sensors can be located in or behind the front and/or rear bumper(s) or body panel(s) of the autonomous vehicle 10. As another example, camera(s) can be located at the front or rear bumper(s) of the vehicle 10 as well. Other locations can be used as well.

In addition to the sensor data, the perception system 103 can retrieve or otherwise obtain map data 126 that provides detailed information about the surrounding environment of the autonomous vehicle 10. The map data 126 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 102 in comprehending and perceiving its surrounding environment and its relationship thereto.

The perception system 103 can identify one or more objects that are proximate to the autonomous vehicle 10 based on sensor data received from the one or more sensors 101 and/or the map data 126. In particular, in some implementations, the perception system 103 can determine, for each object, state data that describes a current state of such object (also referred to as features of the object). As examples, the state data for each object can describe an estimate of the object's: current location (also referred to as position); current speed (also referred to as velocity); current acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the autonomous vehicle; minimum path to interaction with the autonomous vehicle; minimum time duration to interaction with the autonomous vehicle; and/or other state information.

In some implementations, the perception system 103 can determine state data for each object over a number of iterations. In particular, the perception system 103 can update the state data for each object at each iteration. Thus, the perception system 103 can detect and track objects (e.g., vehicles) that are proximate to the autonomous vehicle 10 over time.

The prediction system 104 can receive the state data from the perception system 103 and predict one or more future locations for each object based on such state data. For example, the prediction system 104 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The prediction system 104 can create prediction data associated with each of the respective one or more objects within the surrounding environment of the vehicle 10. The prediction data can be indicative of one or more predicted future locations of each respective object. For example, the prediction data can be indicative of a predicted trajectory (e.g., predicted path) of at least one object within the surrounding environment of the vehicle 10. For example, the predicted trajectory (e.g., path) can indicate a path along which the respective object is predicted to travel over time (and/or the speed at which the object is predicted to travel along the predicted path).

For example, in some implementations, the prediction system 104 can be a goal-oriented prediction system that generates one or more potential goals, selects one or more of the most likely potential goals, and develops one or more trajectories by which the object can achieve the one or more selected goals. For example, the prediction system 104 can include a scenario generation system that generates and/or scores the one or more goals for an object and a scenario development system that determines the one or more trajectories by which the object can achieve the goals. In some implementations, the prediction system 104 can include a machine-learned goal-scoring model, a machine-learned trajectory development model, and/or other machine-learned models.

In some implementations, the predictions system 104 can use state data indicative of an object type or classification to predict a trajectory for the object. As an example, the prediction system 104 can use state data provided by the perception system 103 to determine that particular object (e.g., an object classified as a vehicle) approaching an intersection and maneuvering into a left-turn lane intends to turn left. In such a situation, the prediction system 104 can predict a trajectory (e.g., path) corresponding to a left-turn for the vehicle such that the vehicle turns left at the intersection. Similarly, the prediction system 104 can determine predicted trajectories for other objects, such as bicycles, pedestrians, parked vehicles, etc. The prediction system 104 can provide the predicted trajectories associated with the object(s) to the motion planning system 105.

The motion planning system 105 can determine a motion plan for the autonomous vehicle 10 based at least in part on the predicted trajectories associated with the objects within the surrounding environment of the vehicle and/or the state data for the objects provided by the perception system 103. Stated differently, given information about the current locations of objects and/or predicted trajectories of objects within the surrounding environment of the autonomous vehicle 10, the motion planning system 105 can determine a motion plan for the autonomous vehicle 10 that best navigates the autonomous vehicle 10 relative to the objects at such locations and their predicted trajectories.

In some implementations, the motion planning system 105 can evaluate one or more cost functions and/or one or more reward functions for each of one or more candidate motion plans for the autonomous vehicle 10. For example, the cost function(s) can describe a cost (e.g., over time) of adhering to a particular candidate motion plan while the reward function(s) can describe a reward for adhering to the particular candidate motion plan. For example, the reward can be of opposite sign to the cost.

Thus, given information about the current locations and/or predicted future locations/trajectories of objects, the motion planning system 105 can determine a total cost (e.g., a sum of the cost(s) and/or reward(s) provided by the cost function(s) and/or reward function(s)) of adhering to a particular candidate pathway. The motion planning system 105 can select or determine a motion plan for the autonomous vehicle 10 based at least in part on the cost function(s) and the reward function(s). For example, the motion plan that minimizes the total cost can be selected or otherwise determined. The motion plan can be, for example, a path along which the autonomous vehicle 10 will travel in one or more forthcoming time periods. The motion planning system 105 can provide the selected motion plan to a vehicle controller 106 that controls one or more vehicle controls 107 (e.g., actuators or other devices that control gas flow, steering, braking, etc.) to execute the selected motion plan. In some implementations, the motion planning system 105 can be configured to iteratively update the motion plan for the autonomous vehicle 10 as new sensor data is obtained from one or more sensors 101. For example, as new sensor data is obtained from one or more sensors 101, the sensor data can be analyzed by the perception system 103, the prediction system 104, and the motion planning system 105 to determine the motion plan.

Each of the perception system 103, the prediction system 104, and the motion planning system 105 can be included in or otherwise a part of a vehicle autonomy system configured to determine a motion plan based at least in part on data obtained from one or more sensors 101. For example, data obtained by one or more sensors 101 can be analyzed by each of the perception system 103, the prediction system 104, and the motion planning system 105 in a consecutive fashion in order to develop the motion plan. While FIG. 1 depicts elements suitable for use in a vehicle autonomy system according to example aspects of the present disclosure, one of ordinary skill in the art will recognize that other vehicle autonomy systems can be configured to determine a motion plan for an autonomous vehicle based on sensor data.

Each of the perception system 103, the prediction system 104, the motion planning system 105, and the vehicle controller 106 can include computer logic utilized to provide desired functionality. In some implementations, each of the perception system 103, the prediction system 104, the motion planning system 105, and the vehicle controller 106 can be implemented in hardware, firmware, and/or software controlling a general purpose processor. For example, in some implementations, each of the perception system 103, the prediction system 104, the motion planning system 105, and the vehicle controller 106 includes program files stored on a storage device, loaded into a memory and executed by one or more processors. In other implementations, each of the perception system 103, the prediction system 104, the motion planning system 105, and the vehicle controller 106 includes one or more sets of computer-executable instructions that are stored in a tangible computer-readable storage medium such as RAM hard disk or optical or magnetic media.

The vehicle controller 106 can provide various control signals to the vehicle controls 107 to control the movement of the autonomous vehicle 10. For example, the autonomous vehicle 10 can further include a brake system 108, a throttle system 109, and a steering system 110.

The brake system 108 can be configured to decelerate the autonomous vehicle 10. For example, brake commands can be provided by the vehicle controller 106 via the vehicle controls 107 to the brake system 108, which can cause one or more brakes (e.g., hydraulic brakes, electronic parking brakes, etc.) to decelerate the autonomous vehicle 10.

The throttle system 109 can be configured to accelerate the autonomous vehicle 10. For example, acceleration commands can be provided by the vehicle controller 106 via the vehicle controls 107 to the throttle system 109, which can cause one or more actuators, throttle controls, or other acceleration components to accelerate the autonomous vehicle 10.

The steering system 110 can be configured to control steering of the autonomous vehicle 10. For example, steering commands can be provided by the vehicle controller 106 via the vehicle controls 107 to the steering system 110, which can cause one or more actuators or other steering system components to steer the autonomous vehicle 10.

According to example aspects of the present disclosure, the autonomous vehicle 10 can further include one or more computing device(s) 130. In some implementations, the computing device(s) 130 can be incorporated in or otherwise a part of a vehicle computing system 102. In some implementations, the computing device(s) 130 can be one or more separate computing devices 130 separate from the vehicle computing system 102, and can be configured to communicate with the vehicle computing system 102, such as via one or more wired and/or wireless connections. For example, as shown in FIG. 1, the computing device(s) 130 are separate computing device(s) 130 from the computing device(s) 111; however, in some implementations, the computing device(s) 130 can be the computing device(s) 111 or otherwise incorporated into a vehicle computing system 102.

The one or more computing devices 130 can include one or more processors 132 and one or more memory 134. The one or more processors 132 can be any suitable processing device (e.g., a processor core, a microprocessor, an ASIC, a FPGA, a computing device, a microcontroller, etc.) and can be one processor or a plurality of processors that are operatively connected. The one or more memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which can be executed by the processor 132 to cause the computing device(s) 130 to perform operations. The one or more computing devices 130 can also include a communication interface 119, which can allow the one or more computing devices 130 to communicate with other components of the autonomous vehicle 10 or external computing systems, such as via one or more wired or wireless networks.

In some implementations, the one or more computing devices 130 can further include a state estimator 140. In some implementations, the state estimator can be computer logic utilized to provide desired functionality. For example, the state estimator 140 can be configured to estimate one or more properties of the autonomous vehicle 10 using various inputs. For example, in some implementations, the state estimator 140 can be used to determine a pose of the autonomous vehicle 10. The pose can be, for example, a roll, a pitch, or a yaw of the autonomous vehicle 10, or a position of the autonomous vehicle 10 in a surrounding environment. For example, the pose can generally describe how the autonomous vehicle 10 is positioned in the surrounding environment (e.g., where the autonomous vehicle 10 is located and how the autonomous vehicle 10 is oriented with respect to the surrounding environment). The pose can be used, for example, to orient sensor data from one or more sensors 101 of the autonomous vehicle with respect to the surrounding environment.

In some implementations, the pose can be used to determine the motion plan for the vehicle. For example, the pose can describe how the autonomous vehicle 10 is oriented with respect to the surrounding environment, such as whether the autonomous vehicle 10 is pitching, rolling, or yawing, and a vehicle computing system 102 and/or a motion planning system 105 can use the pose to determine how to maneuver the autonomous vehicle 10 through the surrounding environment.

In some implementations, the state estimator 140 can include a Kalman filter configured to receive a plurality of inputs and determine a state of the autonomous vehicle 10 based on the plurality of inputs. For example, the Kalman filter can receive a plurality of inputs, and each input can have an associated statistical noise, such as an uncertainty and/or inaccuracy parameter. The Kalman filter can be configured to use the plurality of inputs to produce an estimate of one or more properties of the autonomous vehicle. For example, in some implementations, the Kalman filter can receive a plurality of acceleration measurements, such as from a wheel odometry sensor 160 and from an IMU 150, and determine an acceleration parameter for the autonomous vehicle 10. The acceleration parameter can be used, for example, as feedback for controlling a brake system 108, a throttle system 109, and/or other vehicle system.

The one or more computing devices 130 can be configured to communicate with various components of the autonomous vehicle 10. For example, in various implementations, the computing device(s) 130 can receive signals and/or data from one or more IMUS 150, wheel odometry sensor(s) 160, the brake system 108, the throttle system 109, the steering system 110, and/or other components of the autonomous vehicle 10.

For example, in some implementations, the state estimator 140 can receive acceleration measurements from one or more wheel odometry sensors 160 and/or an IMU 150. However, due to the relative motion of the first portion of the vehicle to the second portion (e.g., pitch or roll of a cab portion relative to a chassis portion) the acceleration measurements provided by the wheel odometry sensors 160 and/or IMU 150 may not correspond to one another.

Figure 5:
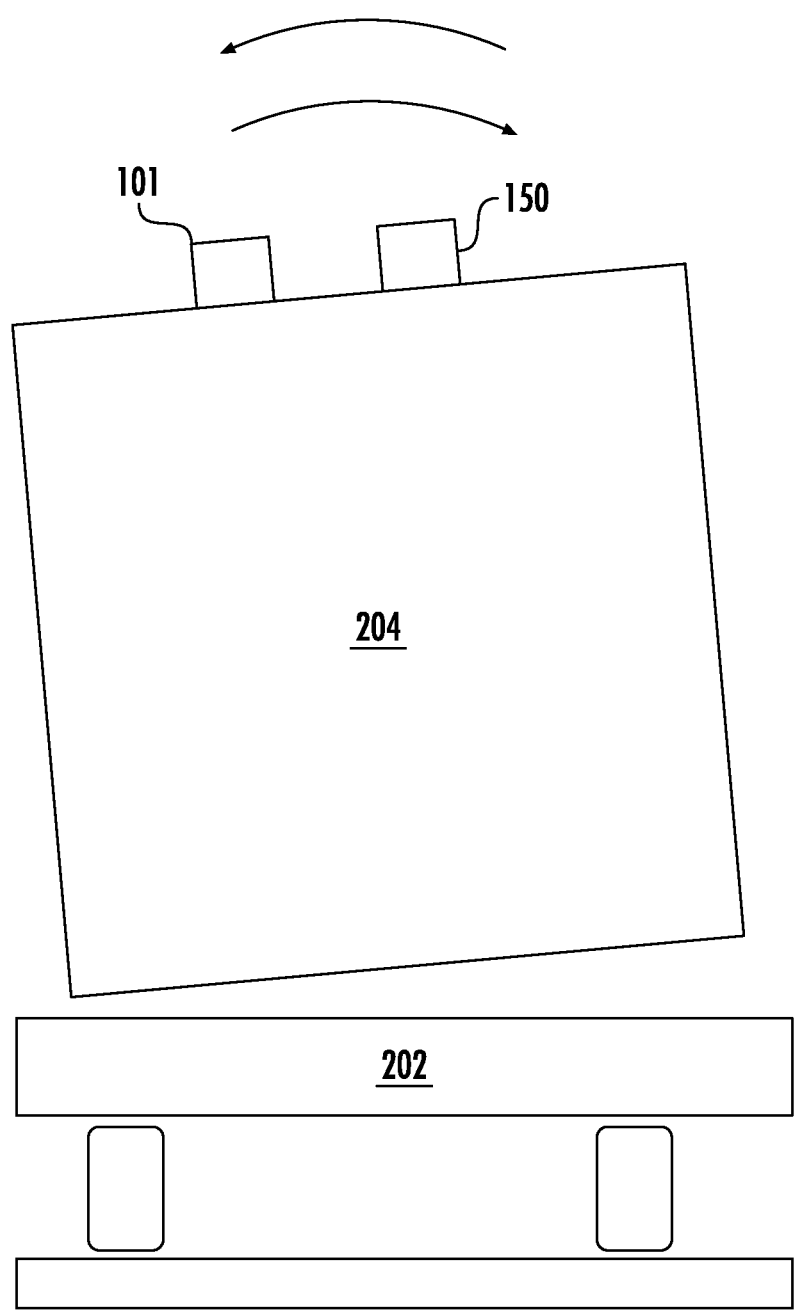
FIG. 5 depicts a diagram of example vehicle movement of a first portion relative to a second portion of an autonomous vehicle according to example aspects of the present disclosure.

For example, referring now to FIG. 5, an example movement of the cab portion 204 relative to the chassis portion 202 of a vehicle 200 is shown. As the vehicle 200 travels over various terrain features, the cab portion 204 may roll from side to side relative to the chassis portion 202. For example, during a turn, the cab portion 204 may roll due to the acceleration forces on the vehicle 200. Similarly, one or more wheels 206 driving over a pothole in a travel way may cause the cab portion 204 to roll relative to the chassis portion 202.

Figure 6:
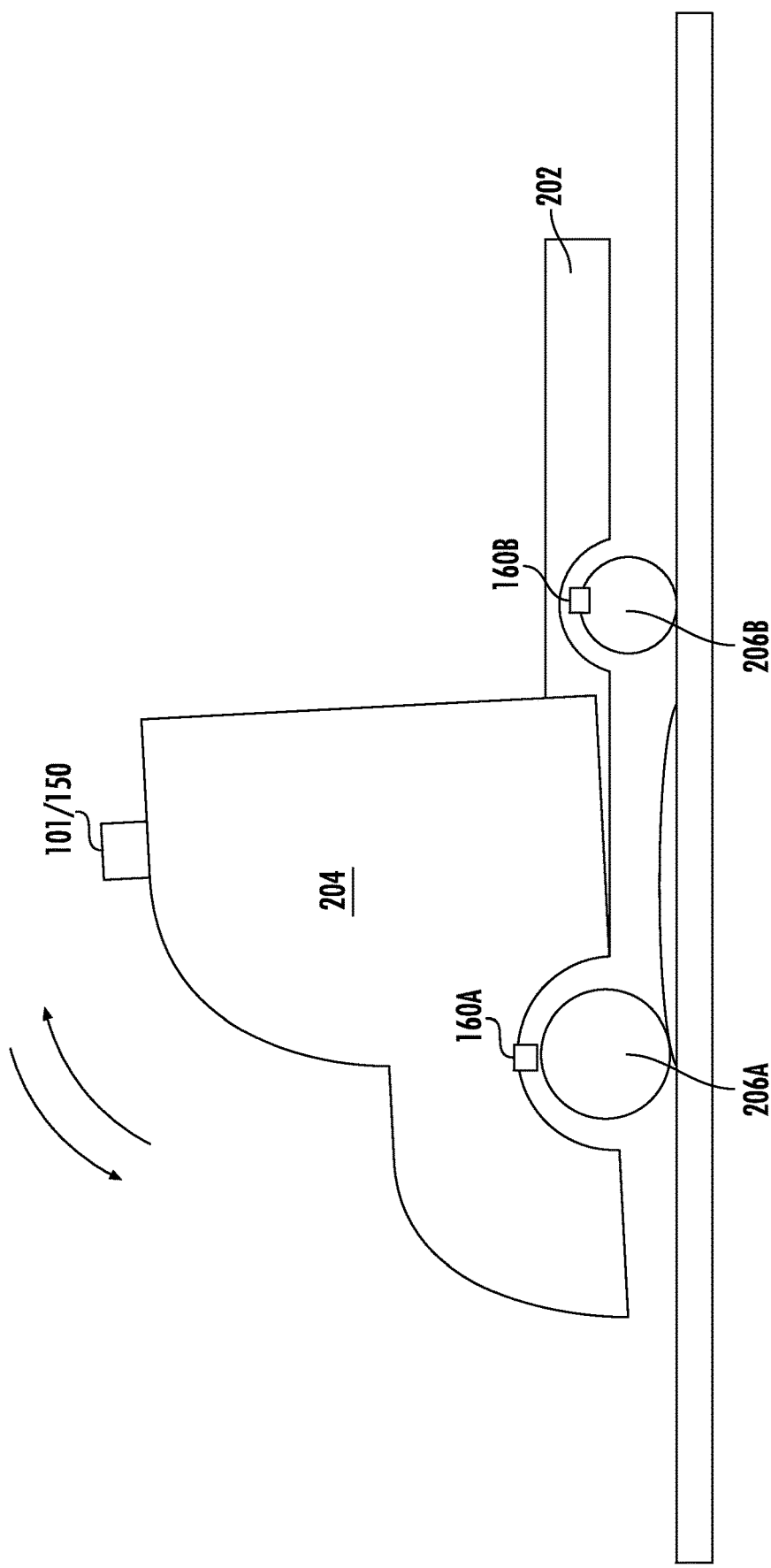
FIG. 6 depicts a diagram of example vehicle movement of a first portion relative to a second portion of an autonomous vehicle according to example aspects of the present disclosure.

Similarly, as shown in FIG. 6, another example movement of a cab portion 204 relative to a chassis portion 202 is shown. As the vehicle 200 travels over various terrain features, such as speed bumps, potholes, or other terrain features, the cab portion 204 may pitch forward and/or backward relative to the chassis portion 202.

Referring back to FIG. 1, such pitch and/or roll of a first portion relative to a second portion can cause acceleration-related sensor mismatch. For example, as a vehicle 200 travels over a pothole, the cab portion 204 of a vehicle 200 may pitch back and forth or roll side to side relative to the chassis portion 202. An IMU 150 positioned on top of a cab portion 204, therefore, may measure acceleration along a pitch or roll axis due to the relative motion of the cab portion 204 to the chassis portion 202. However, if the vehicle 200 is travelling at a relatively constant velocity, a wheel odometry sensor 160 may not measure any acceleration, as the wheels may be rotating at a constant rotational velocity. Similarly, if the vehicle 200 is accelerating along a lateral direction when the pothole is travelled over, the pitch and/or roll of the cab portion 204 relative to the chassis portion 202 may effectively "cancel out" the corresponding lateral acceleration, and therefore indicate the vehicle is not accelerating. When such acceleration measurements are provided to a state estimator 140, the state estimator 140 may incorrectly determine that the vehicle is or is not accelerating, such as along the lateral direction of travel, due to the acceleration-related sensor mismatch.

Further, this can cause the state estimator 140 (and/or a vehicle computing system 102) to incorrectly determine the pose of the vehicle 10. For example, in some situations, the state estimator 140 may interpret the pitch and/or roll of the cab portion 204 as the pitch and/or roll of the autonomous vehicle 10. Moreover, in some situations, the state estimator 140 may not account for the pitch and/or roll of the cab portion 204, and therefore incorrectly interpret data from one or more sensors 101.

For example, as the cab portion pitches and/or rolls, a LIDAR sensor positioned on top of the cab portion 204 may send light signals which reflect off of the travelway (e.g., road surface) on which the autonomous vehicle 10 is travelling. In some situations, the reflected LIDAR signals may be misinterpreted by the state estimator 140, the vehicle computing system 102, or other vehicle system as an obstacle in front of the autonomous vehicle 10. In response, the vehicle computing system 102 may control the autonomous vehicle 10 to a stop in order to avoid colliding with the misinterpreted roadway obstacle.

According to example aspects of the present disclosure, a computing system, such one or more computing devices 111/130, can be configured to compensate for such acceleration-related sensor mismatch. For example, a computing device 130 can be configured to obtain data indicative of an acceleration mismatch between a first portion and a second portion of the autonomous vehicle.

For example, in some implementations, the computing device 130 can obtain data indicative of a first measurement from a first sensor (e.g., IMU 150), and data indicative of a second measurement from a second sensor (e.g., wheel odometry sensor 160) and can determine that the measurements do not match. For example, an acceleration measurement from an IMU 150 may indicate that a vehicle is accelerating due to a pitch motion of the cab portion 204, while an acceleration measurement from a wheel odometry sensor 160 may indicate that the vehicle 200 is not experiencing any acceleration. In some implementations, the computing device 130 can be configured to obtain data indicative of an acceleration mismatch by obtaining respective signals from the first sensor and the second sensor.

In some implementations, the computing device 130 can obtain data indicative of the acceleration mismatch by obtaining a signal associated with a brake system 108, a throttle system 109, and/or a steering system 110.

For example, in some implementations, the vehicle controller 106 and/or vehicle controls 107 can send a signal to a throttle system 109 or a brake system 108 of the autonomous vehicle 10 in order to cause the throttle system 109 or the brake system 108 to accelerate or decelerate the autonomous vehicle 10. In some implementations, the computing device 130 can be configured to obtain or otherwise receive signals associated with the brake system 108 or throttle system 109. In some implementations, the acceleration or deceleration of the autonomous vehicle 10 can be known to cause an acceleration mismatch for one or more sensors 101. For example, operating the autonomous vehicle at a particular throttle system or brake system setpoint can be known to cause the first portion (e.g., cab portion 204) to move (e.g., pitch) with respect to the second portion (e.g., chassis portion 202).

Similarly, in some implementations, the computing device 130 can obtain data indicative of the acceleration mismatch by obtaining a signal associated with a steering system 110. For example, the vehicle controller 106 and/or vehicle controls 107 can send a signal to a steering system 110 in order to cause the steering system 110 to turn the autonomous vehicle 10. In some implementations, turning at a particular rate can be known to cause an acceleration mismatch for one or more sensors 101. For example, turning the autonomous vehicle 10 at a particular angular rate can be known to cause the first portion (e.g., cab portion 204) to move (e.g., roll) with respect to the second portion (e.g., chassis portion 202).

In some implementations, the data indicative of the acceleration mismatch can be data indicative of an acceleration value greater than a threshold. For example, in some situations, an acceleration measurement from a single sensor (101, 150, 160, etc.) that exceeds a threshold value can be known to cause acceleration-related sensor mismatch. Thus, in some implementations, data indicative of an acceleration-related sensor mismatch does not require a comparison of two or more sensor values. Rather, a single sensor measurement can be known to cause acceleration-related mismatch, and can be compensated for accordingly.

For example, traveling over a pothole or other roadway feature may cause the cab portion 204 to pitch or roll with respect to the chassis portion 202. In such a situation, a sensor (e.g., IMU 150) positioned on the cab portion 204 may measure an acceleration that exceeds a threshold due to the swaying motion of the suspension's response to the pothole. In some implementations, the threshold value can be a value determined at least in part on one or more previous driving sessions in which the autonomous vehicle 10 experienced an acceleration which caused sensor mismatch, such as, for example, driving over a pothole or other roadway feature. The computing device 130 can be configured to obtain or otherwise receive a signal from the IMU 150. The signal from the IMU 150 can include data indicative of an acceleration value greater than the threshold from the sensor (e.g., IMU 150).

Similarly, a wheel odometry sensor 160 may measure an acceleration that exceeds a threshold. The computing device 130 can similarly be configured to obtain or otherwise receive data indicative of an acceleration mismatch by obtaining data and/or a signal from the wheel odometry sensor 160. For example, the signal from the wheel odometry sensor 160 can include data indicative of an acceleration value greater than a threshold. For example, the acceleration value greater than the threshold can be known to cause the cab portion 204 to pitch and/or roll with respect to the chassis portion 202 such that it can cause acceleration-related sensor mismatch.

Further, signals associated with a throttle system 109, brake system 108, and/or steering system 110 can all similarly be known to cause acceleration-related sensor mismatch when a setpoint (e.g., throttle, brake, or steering setpoint) for the respective system is indicative of an acceleration value that exceeds a threshold. For example, braking too quickly, turning too quickly, and/or accelerating too quickly can be known to cause acceleration-related sensor mismatch. Thus, the computing device 130 can be configured to obtain a signal associated with a brake system 108, a throttle system 109, or a steering system 110, which can be indicative of an acceleration value greater than a threshold.

The computing device 130 can further be configured to determine a sensor compensation action based at least in part on the data indicative of the acceleration mismatch. For example, in some implementations, the computing device can disregard data from an IMU 150 or a wheel odometry sensor 160 for a period of time.

For example, in some implementations, the device 130 can be configured to determine a pose of the autonomous vehicle 10 using the state estimator 140. In some implementations, the state estimator 140 can include a Kalman filter configured to receive a plurality of inputs and determine a state of the autonomous vehicle 10 based on the plurality of inputs. In some implementations, the computing device 130 can disregard data from an IMU 150 or a wheel odometry sensor 160 by not inputting the data indicative of an acceleration mismatch into the state estimator 140, such as by not inputting the data into a Kalman filter of the state estimator 140. For example, in some implementations, if an acceleration value from an IMU 150 exceeds a threshold, the computing device 1320 can disregard the data by not inputting the data from the IMU 150 into the Kalman filter. In other implementations, the computing device 130 can disregard the data indicative of an acceleration mismatch by, for example, providing a null value for a sensor (e.g., IMU 150, wheel odometry sensor 160) into the state estimator (e.g., a zero value), or by inputting a previously obtained acceleration measurement (e.g., holding an input steady by inputting a measurement from a period of time prior to the acceleration value exceeding the threshold). In some implementations, the computing device 130 can disregard the data for a specific period of time (e.g., 100 ms, 500 ms, 1 second, 5 seconds, etc.).

In some implementations, the sensor compensation action can include increasing an uncertainty parameter associated with sensor data from an IMU 150 or a wheel odometry sensor 160. For example, in some implementations, a state estimator 140 can use data from a plurality of sensors 101/150/160, and each respective sensor's data set can include an uncertainty parameter associated with the data from the sensor. In some implementations, the computing device 130 can increase or decrease the uncertainty parameter associated with sensor data.

For example, the computing device 130 can obtain data indicative of an acceleration from an IMU 150 and one or more wheel odometry sensors 160. In some implementations, a first wheel odometry sensor 160A may measure an acceleration that exceeds a threshold and/or exceeds an acceleration measured by a second wheel odometry sensor 160B and/or an IMU 150. In some implementations, the computing device 130 can increase the uncertainty parameter associated with the first wheel odometry sensor 160A. The increased uncertainty parameter can indicate to the state estimator 140 (e.g., Kalman filter), that the associated acceleration measurement may not be accurate. Similarly, the computing device 130 can adjust an uncertainty parameter associated with an IMU 150 or the second wheel odometry sensor 160B. For example, the computing device 130 can decrease the uncertainty parameter associated with the IMU 150 or the second wheel odometry sensor 160B. In this way, the computing device 130 can adjust the uncertainty parameter associated with sensor data from an IMU 150 or a wheel odometry sensor 160.

In some implementations, the sensor compensation action can include modeling the acceleration of the first portion (e.g., cab portion 204) relative to the second portion (e.g., chassis portion 202) using an autonomous vehicle model 142 in a state estimator 140. For example, in some implementations, the state estimator 140 can include one or more autonomous vehicle models 142 configured to model the first portion (e.g., cab portion 204) of the autonomous vehicle 10 moving about the pitch axis and/or the roll axis with respect to the second portion (e.g., chassis portion 202). In some implementations, the model 142 can be a rotational pendulum-spring model. Other suitable models can similarly be used. The data obtained from the IMU 150 and/or wheel odometry sensor(s) 160 can be input into the autonomous vehicle model 142 to model the movement of the first portion (e.g., cab) relative to the second portion (e.g., chassis).

The computing device 130 can be configured to implement the sensor compensation action by, for example, performing the sensor compensation actions described herein. For example, the computing device 130 can disregard data by not inputting it into a model 142 or a state estimator 140, adjusting an uncertainty parameter associated with the data prior to inputting the data into a state estimator 140, or modeling the movement of the first portion relative to the second portion using an autonomous vehicle model 142.

In some implementations, the computing device 130 can obtain data from a first sensor, such as a LIDAR sensor positioned on a first portion of a vehicle 10, and data from a second sensor, such as a LIDAR sensor positioned on a second portion of the vehicle 10. For example, the first LIDAR sensor can be positioned on a cab portion, such as on top of the cab portion, and the second LIDAR sensor can be positioned on a chassis portion, such as on a bumper of the chassis portion. Each LIDAR sensor can be configured to obtain a point cloud of data points of the surrounding environment, and the sensors can be configured to obtain data from overlapping fields of view. For example, at least a portion of the point cloud from each sensor can overlap or correspond to at least a portion of the point cloud of the other sensor. The computing device 130 can be configured to obtain data indicative of an acceleration mismatch between the first portion and the second portion by obtaining data, such as at least a portion of overlapping point clouds, from the first LIDAR sensor and the second LIDAR sensor.

Further, in some implementations, the computing device 130 can determine a sensor compensation action based on the data from the first LIDAR sensor and the second LIDAR sensor. For example, in some implementations, the computing device 130 can determine an angular mismatch between the first LIDAR sensor and the second LIDAR sensor by comparing the outputs of the two sensors. For example, the computing device 130 can determine a compensation or transformation between corresponding points in the data obtained from the sensors by determining an angular shift that decreases or minimizes the difference between the points in the two point clouds. In some implementations, the computing device 130 can use a model, such as a model 142 of the first portion of the vehicle 10 moving relative to the second portion of the vehicle 10, to determine the angular shift.

The computing device 130 can then implement the angular shift by adjusting the sensor data from one of the LIDAR sensors, such as the first LIDAR sensor positioned on top of the cab portion. For example, the computing device 130 can implement the angular shift in the point cloud to adjust the data points in the point cloud. The adjusted data from the LIDAR sensor (and/or other sensors) can then be used to determine a motion plan for the vehicle 10, as described herein. Similarly, the first sensor and the second sensors can be cameras configured to obtain respective imagery data, and can have overlapping fields of view. In some implementations, the imagery data obtained from the overlapping fields of view can be used to determine the angular shift.

In some implementations, the computing device 130 can further determine a pose of the autonomous vehicle 10 following implementation of the sensor compensation action. For example, in some implementations, the computing device 130 can first model the movement of the first portion relative to the second portion to determine an orientation of the first position (e.g., cab portion 204) relative to the second portion (chassis portion 202), and can then determine a yaw, pitch, or roll of the autonomous vehicle 10, or a position of the autonomous vehicle in a surrounding environment of the autonomous vehicle 10. In some implementations, the computing device 130 can disregard data from an IMU 150 or a wheel odometry sensor 160, adjust the uncertainty of such data, and/or use an autonomous vehicle model 142 to determine the pose of the autonomous vehicle 10.

In some implementations, the computing device 130 (either alone or in conjunction with a vehicle computing system 102 or one or more computing devices 111) can further determine a motion plan for the autonomous vehicle 10 based at least in part on the pose. For example, the pose can describe the position and/or orientation of the autonomous vehicle 10 in the surrounding environment, and a motion planning system 105 can determine a motion plan to determine how the autonomous vehicle 10 will travel within the surrounding environment based on the pose.

In some implementations, the computing device 130 (either alone or in conjunction with a vehicle computing system 102 or one or more computing devices 111) can further cause the autonomous vehicle 10 to initiate travel in accordance with at least a portion of the motion plan. For example, the computing device 130 and/or a vehicle controller 106 can control a throttle system 109, brake system 108, steering system 110, and/or another vehicle system to cause the autonomous vehicle 10 to travel within the surrounding environment according to the motion plan.

Figure 7:
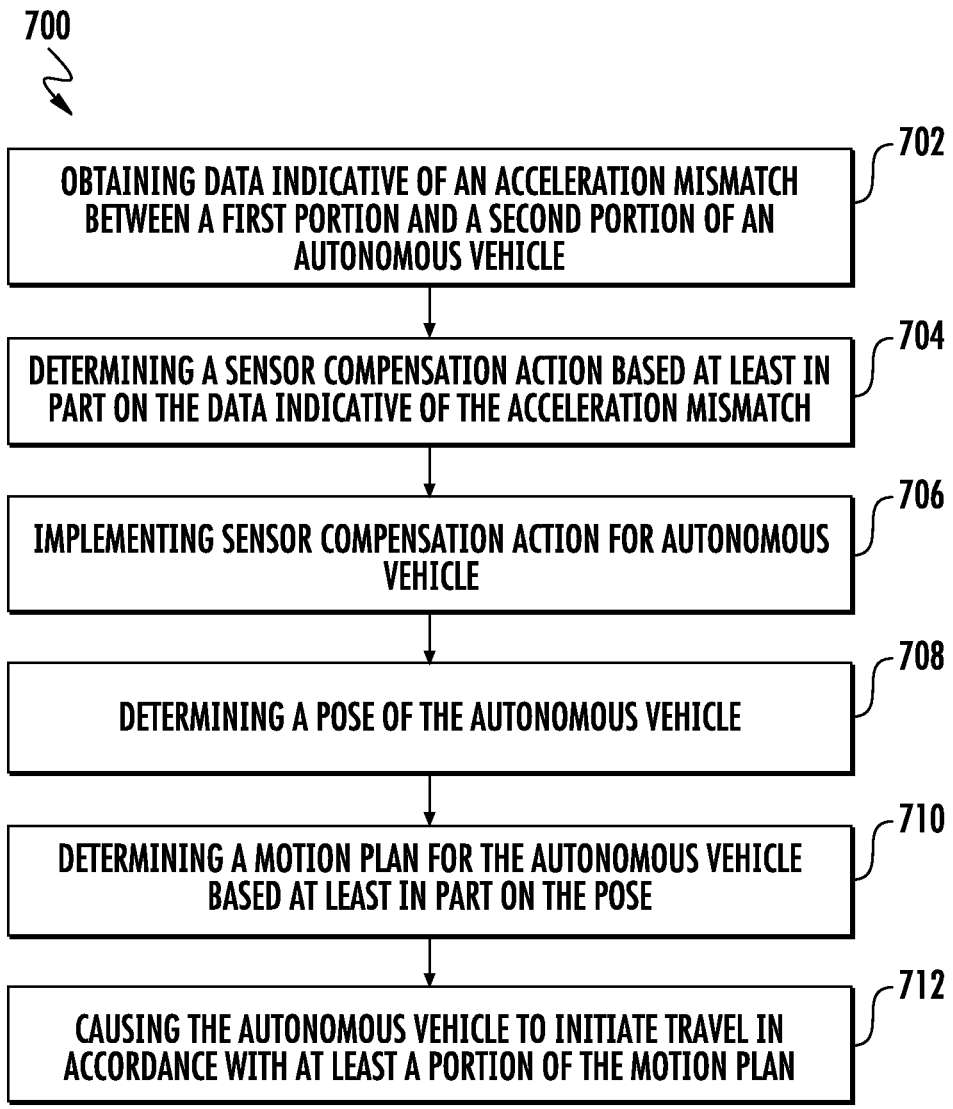
FIG. 7 depicts a flow diagram of an example method of compensating for acceleration-related sensor mismatch of an autonomous vehicle according to example aspects of the present disclosure.

Referring now to FIG. 7, an example method (700) to compensate for autonomous vehicle acceleration-related sensor mismatch is depicted. Although FIG. 7 depicts steps performed in a particular order for purposes of illustration and discussion, the methods of the present disclosure are not limited to the particularly illustrated order or arrangement. The various steps of method (700) can be omitted, rearranged, combined, and/or adapted in various ways without deviating from the scope of the present disclosure. The method (700) can be implemented by a computing system, such as a computing system 102 comprising one or more computing devices 111/130. The computing devices can include, for example, one or more processors and one or more tangible, non-transitory computer-readable memory.

At (702), the method (700) can include obtaining data indicative of an acceleration mismatch between a first portion and a second portion of an autonomous vehicle. For example, in some implementations, the first portion can be a cab portion 204 and the second portion can be a chassis portion 202 of an autonomous vehicle 200. The first portion can be configured to move relative to the second portion, such as, for example, about a pitch axis and/or a roll axis.

In some implementations, the data indicative of the acceleration mismatch can be obtained from a brake system, a throttle system, a steering system, a wheel odometry sensor, or an inertial measurement unit. For example, in some implementations, one or more IMUS 150 and/or wheel odometry sensors 160 can be configured to obtain acceleration measurements for an autonomous vehicle 10. In some implementations, the data indicative of the acceleration-related sensor mismatch can be data from the IMU 150, the wheel odometry sensor 160, or both. In some implementations, the data indicative of the acceleration-related sensor mismatch can be based on a comparison of acceleration measurements from two or more sensors, such as from an IMU 150 and a wheel odometry sensor 160, and/or a first wheel odometry sensor 160A and a second wheel odometry sensor 160 B. In some implementations, the data indicative of the acceleration mismatch can be a signal associated with a brake system 108, a throttle system 109, and/or a steering system 110.

For example, in some implementations, the data indicative of the acceleration mismatch can be an acceleration value that is greater than a threshold value. For example, the threshold can be an acceleration threshold known to cause acceleration-related sensor mismatch. In some implementations, the data indicative of the acceleration mismatch can be data from a single sensor and/or system which exceeds the threshold. For example, a signal associated with a brake system 108 indicating an acceleration (such as a deceleration) value which exceeds the threshold can be known to cause the first portion to move relative to the second portion, thereby causing acceleration-related sensor mismatch. In some implementations, the data indicative of the acceleration mismatch can be the signal associated with the brake system 108.

At (704), the method (700) can include determining a sensor compensation action based at least in part on the data indicative of the acceleration mismatch. In some implementations, the sensor compensation action can be associated with sensor data acquired via an inertial measurement unit 150 or a wheel odometry sensor 160 of the autonomous vehicle 10.

In some implementations, determining the sensor compensation action can include disregarding data from the inertial measurement unit or the wheel odometry sensor for a period of time. For example, in some implementations, data obtained from an IMU 150 and/or a wheel odometry sensor 160 can be provided to a state estimator 140. In some implementations, the sensor compensation action can include disregarding such data for a period of time. For example, in some implementations, a computing system can disregard the data from the IMU 150 and/or the wheel odometry sensor 160 by not inputting the data into the state estimator 140. In some implementations, a null value and/or a previously obtained value can be input into the state estimator 140 instead of the sensor data from the sensor 150/160.

In an in some implementations, determining the sensor compensation action can include adjusting an uncertainty parameter associated with the sensor data. For example, data from an IMU 150 and/or a wheel odometry sensor 160 can have an associated uncertainty parameter, which can be indicative of the reliability/accuracy/uncertainty of the associated sensor data. For example, a state estimator 140 can use and associated uncertainty parameter to determine how much weight to provide to the associated sensor data. For example, in some situations, sensor data from an IMU 150 may have a relatively low uncertainty parameter, whereas sensor data from a wheel odometry sensor 160 may have a relatively high uncertainty parameter. In such a situation, a state estimator 140 may give more weight to the sensor data from the IMU 150. In some implementations, the sensor compensation action can include adjusting an uncertainty parameter associated with sensor data. For example, the uncertainty parameter associated with data from an IMU 150 and/or a wheel odometry sensor 160 can be increased and/or decreased.

In some implementations, determining the sensor compensation action can include modeling the movement of the first portion relative to the second portion. For example, in some implementations, one or more autonomous vehicle models 142 can be included in a state estimator 140. In some implementations, the one or more autonomous vehicle models 142 can be configured to model a first portion (e.g., cab portion 204) moving relative to a second portion (e.g., chassis portion 202). In some implementations, the first portion of the autonomous vehicle model 142 can move about a pitch axis and/or a roll axis relative to the second portion.

At (706), the method (700) can include implementing the sensor compensation action for the autonomous vehicle. For example, in various implementations, the computing system can disregard sensor data, adjust uncertainty parameters, model the movement of a first portion relative to a second portion, or implement any other sensor compensation action as described herein.

At (708), the method (700) can include determining a pose of the autonomous vehicle. For example, in some implementations, a state estimator 140, such as a state estimator 140 comprising a Kalman filter, can be used to determine a pose of an autonomous vehicle 10. In some implementations, the pose can describe one or more of a roll, a pitch, or a yaw of the autonomous vehicle 10, or a position of the autonomous vehicle 10 in a surrounding environment of the autonomous vehicle 10.

At (710), the method (700) can include determining a motion plan for the autonomous vehicle based at least in part on the pose. For example, in some implementations, a motion planning system 105 of a vehicle computing system 102 can be configured to use the pose to determine a motion plan for the autonomous vehicle 10. The motion plan can include, for example, a trajectory for the autonomous vehicle 10 to travel through the surrounding environment.

At (712), the method (700) can include causing the autonomous vehicle to initiate travel in accordance with at least a portion of the motion plan. For example, a vehicle controller 106 and/or vehicle controls 107 can send various control signals to a brake system 108, a throttle system 109, a steering system 110, or other vehicle system in order to cause the autonomous vehicle 10 to travel in accordance with at least a portion of the motion plan. In this way, the autonomous vehicle can be caused to initiate travel in accordance with the motion plan.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for compensating for autonomous vehicle acceleration-related sensor mismatch, comprising:
one or more processors; and
one or more tangible, non-transitory, computer readable media that collectively store instructions that when executed by the one or more processors cause the computing system to perform operations, the operations comprising:
obtaining data indicative of an acceleration mismatch between a first portion and a second portion of an autonomous vehicle, the first portion and the second portion of the autonomous vehicle configured to move relative to one another about at least a pitch axis or a roll axis;
determining a sensor compensation action based at least in part on the data indicative of the acceleration mismatch; and
implementing the sensor compensation action for the autonomous vehicle.

2. The computing system of claim 1, wherein the data indicative of the acceleration mismatch between the first portion and the second portion comprises a signal associated with a brake system, a throttle system, a steering system, a wheel odometry sensor, an inertial measurement unit, a camera, or a LIDAR sensor.

3. The computing system of claim 1, wherein the data indicative of the acceleration mismatch comprises data indicative of an acceleration value greater than a threshold.

4. The computing system of claim 1, wherein the sensor compensation action comprises disregarding data from an inertial measurement unit or a wheel odometry sensor of the autonomous vehicle for a period of time.

5. The computing system of claim 4, wherein implementing the sensor compensation action comprises not inputting the disregarded data into a state estimator configured to determine a pose of the autonomous vehicle, the state estimator comprising a Kalman filter.

6. The computing system of claim 1, wherein the sensor compensation action comprises adjusting an uncertainty parameter associated with sensor data from at least one of an inertial measurement unit or a wheel odometry sensor of the autonomous vehicle.

7. The computing system of claim 1, wherein the sensor compensation action comprises modeling the movement of the first portion relative to the second portion using an autonomous vehicle model in a state estimator, the state estimator comprising a Kalman filter.

8. The computing system of claim 7, wherein the autonomous vehicle model comprises a model configured to model the first portion moving about a least one of a pitch axis or a roll axis relative to the second portion.

9. The computing system of claim 1, wherein the operations further comprise:
following implementation of the sensor compensation action, determining a pose of the autonomous vehicle, the pose comprising at least one of a roll, a pitch, or a yaw of the autonomous vehicle, or a position of the autonomous vehicle in a surrounding environment of the autonomous vehicle.

10. The computing system of claim 9, wherein the operations further comprise:
determining a motion plan for the autonomous vehicle based at least in part on the pose of the autonomous vehicle; and
causing the autonomous vehicle to initiate travel in accordance with at least a portion of the motion plan.

11. The computing system of claim 1, wherein obtaining data indicative of an acceleration mismatch between a first portion and a second portion of an autonomous vehicle comprises obtaining first sensor data from a first sensor and second sensor data from a second sensor; wherein the first sensor and the second sensor are configured to have overlapping fields of view such that at least a portion of the sensor first sensor data corresponds to at least a portion of the second sensor data;
wherein determining a sensor compensation action based at least in part on the data indicative of the acceleration mismatch comprises determining an angular shift based on the first sensor data and the second sensor data; wherein the angular shift decreases the difference between the first sensor data and the second sensor data; and
wherein implementing the sensor compensation action for the autonomous vehicle comprises implementing the angular shift to adjust the first sensor data or the second sensor data.

12. A computer-implemented method for compensating for autonomous vehicle acceleration-related sensor mismatch, comprising:
obtaining, by a computing system that comprises one or more computing devices, data indicative of an acceleration mismatch between a first portion and a second portion of an autonomous vehicle, the first portion and the second portion of the autonomous vehicle configured to move relative to one another about at least a pitch axis or a roll axis;
determining, by the computing system, a sensor compensation action based at least in part on the data indicative of the acceleration mismatch, wherein the sensor compensation action is associated with sensor data acquired via an inertial measurement unit or a wheel odometry sensor of the autonomous vehicle; and
implementing, by the computing system, the sensor compensation action for the autonomous vehicle.

13. The computer-implemented method of claim 12, wherein obtaining, by the one or more computing devices, the data indicative of the acceleration mismatch comprises obtaining at least one of a signal associated with a brake system, a throttle system, a steering system, a wheel odometry sensor, an inertial measurement unit, a camera, or a LIDAR sensor.

14. The computer-implemented method of claim 12, wherein the data indicative of the acceleration mismatch comprises an acceleration value that is greater than a threshold value.

15. The computer-implemented method of claim 12, wherein determining, by the computing system, the sensor compensation action comprises disregarding data from the inertial measurement unit or the wheel odometry sensor for a period of time, and
wherein implementing, by the computing system, the sensor compensation action comprises disregarding the disregarded data by not inputting the disregarded data into a state estimator, the state estimator configured to determine a pose of the autonomous vehicle.

16. The computer-implemented method of claim 12, wherein determining, by the computing system, the sensor compensation action comprises adjusting an uncertainty parameter associated with the sensor data.

17. The computer-implemented method of claim 12, wherein determining, by the computing system, the sensor compensation action comprises modeling the movement of the first portion relative to the second portion using an autonomous vehicle model in a state estimator;
wherein the autonomous vehicle model comprises a model of the first portion moving about at least one of a pitch axis or a roll axis relative to the second portion.

18. The computer-implemented method of claim 12, further comprising:
determining, by the computing system, a pose of the autonomous vehicle, the pose comprising at least one of a roll, a pitch, or a yaw of the autonomous vehicle, or a position of the autonomous vehicle in a surrounding environment of the autonomous vehicle;
determining, by the computing system, a motion plan for the autonomous vehicle based at least in part on the pose of the autonomous vehicle; and
causing, by the computing system, the autonomous vehicle to initiate travel in accordance with at least a portion of the motion plan.

19. An autonomous vehicle, comprising:
a chassis;
a cab mounted to the chassis;
a throttle system configured to accelerate the autonomous vehicle;
a brake system configured to decelerate the autonomous vehicle;
a steering system configured to control steering of the autonomous vehicle;
an inertial measurement unit;
a wheel odometry sensor; and
a computing system, comprising:
one or more processors; and
one or more tangible, non-transitory, computer readable media that collectively store instructions that when executed by the one or more processors cause the computing system to perform operations, the operations comprising:
obtaining data indicative of an acceleration mismatch between the cab and the chassis;
determining a sensor compensation action based at least in part on the data indicative of the acceleration mismatch, wherein the sensor compensation action is associated with sensor data acquired via the inertial measurement unit or the wheel odometry sensor; and
determining a pose of the autonomous vehicle based at least in part on the sensor compensation action.

20. The autonomous vehicle of claim 19, wherein the operations further comprise:
determining a motion plan for the autonomous vehicle based at least in part on the pose; and
causing the autonomous vehicle to initiate travel in accordance with at least a portion of the motion plan.

* * * * *